United States Patent
Banerjee et al.

(10) Patent No.: US 12,229,051 B2
(45) Date of Patent: *Feb. 18, 2025

(54) MEMORY MANAGEMENT DEVICE FOR PERFORMING DMA OPERATIONS BETWEEN A MAIN MEMORY AND A CACHE MEMORY

(71) Applicant: Intel Germany Gmbh & Co. KG, Neubiberg (DE)

(72) Inventors: Ritesh Banerjee, Bangalore (IN); Jiaxiang Shi, Singapore (SG); Ingo Volkening, Singapore (SG)

(73) Assignee: Intel Germany GmbH & Co. KG, Neubiberg (DE)

( * ) Notice: Subject to any disclaimer, the term of this patent is extended or adjusted under 35 U.S.C. 154(b) by 0 days.

This patent is subject to a terminal disclaimer.

(21) Appl. No.: 18/147,719

(22) Filed: Dec. 29, 2022

(65) Prior Publication Data
US 2023/0195633 A1    Jun. 22, 2023

Related U.S. Application Data

(63) Continuation of application No. 17/455,220, filed on Nov. 17, 2021, now abandoned, which is a continuation of application No. 15/527,138, filed as application No. PCT/EP2015/077507 on Nov. 24, 2015, now Pat. No. 11,354,244.

(30) Foreign Application Priority Data

Nov. 25, 2014   (SG) .............................. 10201407795P

(51) Int. Cl.
| | |
|---|---|
| *G06F 12/0831* | (2016.01) |
| *G06F 12/0811* | (2016.01) |
| *G06F 12/1081* | (2016.01) |
| *G06F 12/08* | (2016.01) |

(52) U.S. Cl.
CPC ...... *G06F 12/0835* (2013.01); *G06F 12/0811* (2013.01); *G06F 12/1081* (2013.01); *G06F 12/08* (2013.01); *G06F 2212/1024* (2013.01)

(58) Field of Classification Search
CPC .. G06F 12/0811; G06F 12/1081; G06F 12/08; G06F 12/0835; G06F 13/287; G06F 2212/621; G06F 2212/1016; G06F 12/0815; G06F 12/1009; G06F 2212/152; G06F 2212/657

USPC ................ 711/122, 202, E12.001, 141, 118, 711/E12.026, 203, E12.035, E12.061

See application file for complete search history.

(56) References Cited

U.S. PATENT DOCUMENTS

| | | | | |
|---|---|---|---|---|
| 5,555,398 A | * | 9/1996 | Raman ................ | G06F 12/0835 |
| | | | | 711/143 |
| 6,748,463 B1 | * | 6/2004 | Tsuboi ................ | G06F 12/0835 |
| | | | | 711/146 |
| 9,524,121 B2 | * | 12/2016 | Maeda .................. | G06F 3/0646 |

(Continued)

*Primary Examiner* — Sanjiv Shah
*Assistant Examiner* — Edward Waddy, Jr.
(74) *Attorney, Agent, or Firm* — 2 SPL Patent Attorneys PartG mbB; Yong Beom Hwang

(57) ABSTRACT

Memory modules and associated devices and methods are provided using a memory copy function between a cache memory and a main memory that may be implemented in hardware. Address translation may additionally be provided.

17 Claims, 1 Drawing Sheet

(56) References Cited

U.S. PATENT DOCUMENTS

| | | | |
|---|---|---|---|
| 2002/0108019 A1* | 8/2002 | Allen | G06F 12/0862 711/3 |
| 2005/0138232 A1* | 6/2005 | Tamura | G06F 12/0808 710/22 |
| 2007/0083682 A1* | 4/2007 | Bartley | G06F 13/28 710/22 |
| 2009/0055611 A1* | 2/2009 | Adiraju | G07F 17/3202 711/E12.103 |
| 2010/0106948 A1* | 4/2010 | Bellows | G06F 13/28 712/E9.034 |
| 2010/0235579 A1* | 9/2010 | Biles | G06F 12/127 711/E12.001 |

* cited by examiner

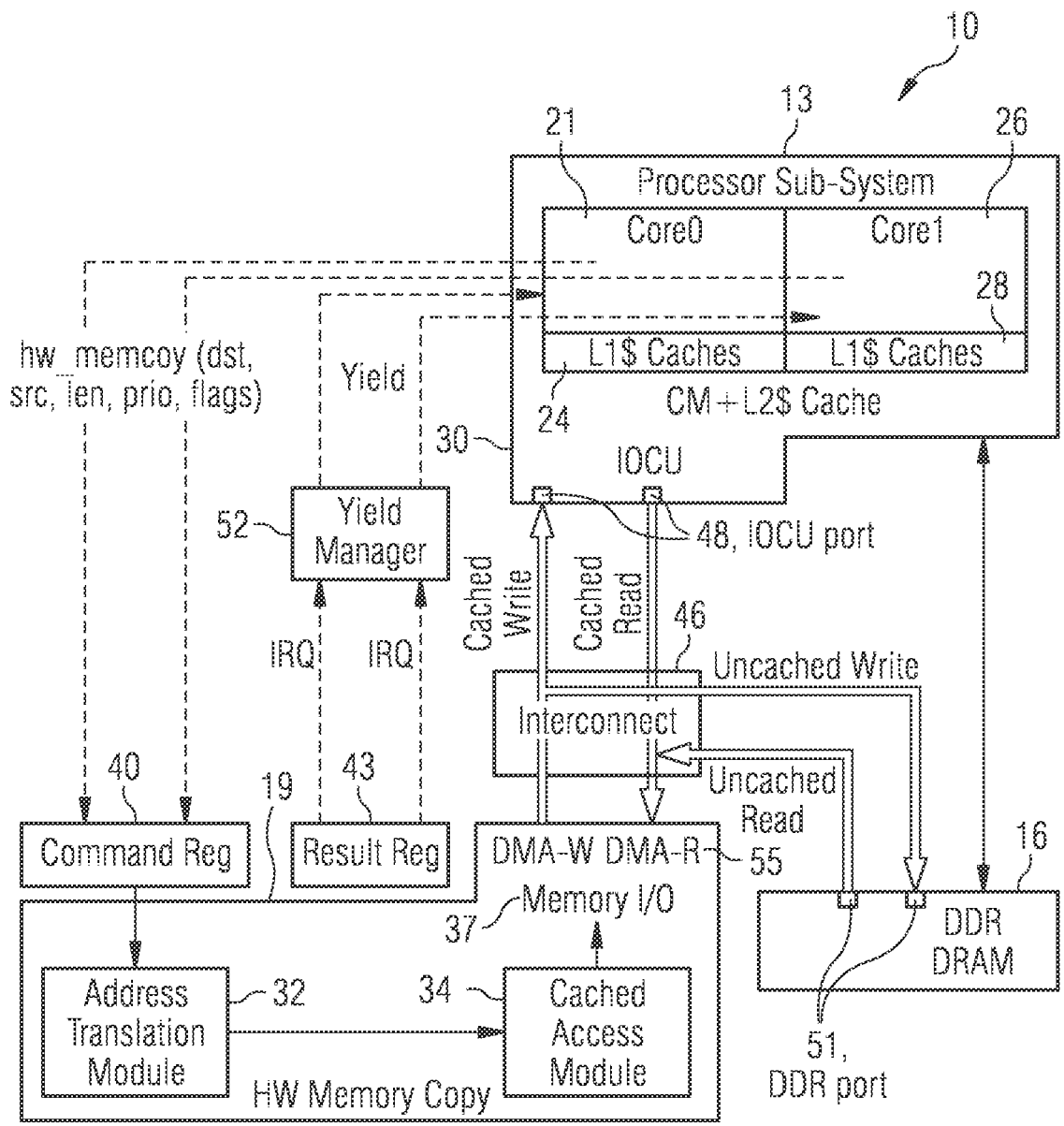

MEMORY MANAGEMENT DEVICE FOR PERFORMING DMA OPERATIONS BETWEEN A MAIN MEMORY AND A CACHE MEMORY

REFERENCE TO RELATED APPLICATION

This Application is a continuation of U.S. patent application Ser. No. 17/455,220 filed on Nov. 17, 2021, which is a continuation of U.S. patent application Ser. No. 15/527,138 filed on May 16, 2017, which is a National Phase entrance of PCT Application No. PCT/EP2015/077507 filed on Nov. 24, 2015 and issued as U.S. Pat. No. 11,354,244 on Jun. 7, 2022, which claims priority to Singapore Patent Application No. 10201407795P filed on Nov. 25, 2014, the contents of which are incorporated herein by reference in its entirety as if fully set forth.

TECHNICAL FIELD

The application relates to memory management devices and to corresponding methods.

BACKGROUND

Memories are generally used to store data. Memory access times, together with other parameters like processor speed, may determine a speed of operation of a system. For example, in conventional systems processors may not be able to perform other tasks, e.g. executing instructions, while accessing a memory. Therefore, memory management approaches have been developed to enable efficient memory access and/or efficient handling of data stored in a memory.

US 20130057562 A1 shows techniques for accessing graphics data stored in a memory. In some implementations, the techniques may include performing data modification tasks independently from an execution of one or more programs for example on a graphics processing unit (GPU), which is an example for a processor. For instance, the techniques of this document may allow the GPU to separate tasks related to memory management and data modification from tasks related to data processing, and allow for independent execution of these tasks. As one example, techniques described in this document may allow the GPU to retrieve data from memory or store data in memory, and in parallel with performing such functions, execute instructions of one or more programs. As another example, techniques described in this patent may allow the GPU to convert data into a more suitable form, which instructions to be executed then utilize, independently from the execution of the instructions themselves.

However, there is still a need for improved memory devices, memory management systems and associated methods which may for example reduce the burden for a processor regarding memory operations.

SUMMARY

The independent claims define various aspects of the present application. The dependent claims define further embodiments. Features from different claims may be combined unless noted otherwise.

According to one embodiment, the application provides a memory module, also referred to as data memory module herein, for a computing device.

The computing device is provided with a software program that includes instructions for finding, organizing, and/ or changing data. An example of the computing device is a computer or server. Another example may be an integrated system provided with a memory, a processor and other components. The data memory module is used for storing e.g. the above data, which is used by the computing device.

The data memory module may include a main memory (e.g. main memory unit), at least one cache memory (e.g. cache memory unit), and a memory copy device (e.g. memory copy unit).

The cache memory is usually a smaller and faster memory, which stores copies of frequently used data of the main memory. A central processing unit (CPU) of a computer or other processor like a graphics processing unit (GPU) often uses the cache memory to reduce average time to access data from the main memory. In practice, a predetermined waiting time is usually required to synchronize data between the main memory and the cache memory.

This synchronization is especially important when large amounts of data are involved and may keep data in the cache memory and the main memory consistent with each other.

The memory copy device is communicatively connected with the main memory and with the cache memory.

The memory copy device comprises at least one Direct Memory Access (DMA) port, an address translation device and a cached access module device.

The DMA port is used for accessing data in the main memory and data in the cache memory. Via the DMA port, the memory copy device is able to access data independently of a processor like a CPU or GPU.

The address translation device is used for translating between a memory physical address and a memory virtual address and/or between a cache memory address and a main memory address.

The cached access module device is used for reading and writing data between the cache memory and the main memory via the DMA port for maintaining date integrity and coherence.

The DMA port allows transfer of data between the main memory and the cache memory independently of a processor like a CPU or GPU. In effect, in embodiments this makes the processor free to perform other tasks during this access of data. This thereby allows for a more efficient use of computing resources, which is especially important when large amounts of data are transferred between the main memory and the cache memory.

This form of data transfer between the main memory and the cache memory may largely be based on hardware to perform the data transfer. For example, the memory copy device may be implemented as an integrated circuit like an application specific integrated circuit (ASIC) and may be integrated together with the cache memory and the main memory. This form of data transfer may be faster and useful for transferring of large amounts of data.

This approach is different from many conventional implementations that use a processor like a CPU for the data transfer between cache memory and main memory, which is based largely on software running on the processor to do the data transfer.

According to another aspect, the instant application also provides a computing device. The computing device includes at least one processing core module and the above memory module. The processing core module stores data in the memory module and reads data from the memory module.

According to yet another aspect, the instant application also provides a computer server. The computer server comprises a network module that includes the above computing device.

The network module may include one or more devices selected from a group consisting of a router device, a gateway device, and a Network Attached Storage (NAS) device.

According to yet another aspect, the instant application provides a method of operating a memory module.

The method includes translating an address between memory physical address and memory virtual address or between a cache memory address and a main memory address, e.g. by an address translation device. The method further includes (e.g. after the address translation) reading and/or writing data between a cache memory and a main memory via a Direct Memory Access (DMA) (e.g. a corresponding DMA port) in order to maintain data integrity and coherence between the cache memory and the main memory. This may e.g. be performed by a cached access module device.

According to another aspect, the instant application provides a computer with a memory device, a memory copy device, and a Central Processing Unit (CPU). The memory copy device may be a Hardware Memory Copy (HWMemCopy) engine.

The memory device in this aspect includes a main memory, a cache memory, and a buffer memory. The memory device may be implemented using a Dynamic Random Access Memory (DRAM) and/or a Static Random Access Memory (SRAM).

Different from other memories of devices such as routers, gateways, and Network Attached Storage (NAS) devices, the memory copy device does not use resources of a processor like a CPU. The memory copy device may improve networking throughput and/or may improve or maximise application performance e.g. on embedded CPUs. It may efficiently keep load relating to memory data away from a processor like a CPU or GPU. This load may comprise load due to memory address translation and copying data, which are described below.

Software applications of the computer often use a virtual address schemes for memories for easier implementation.

The virtual address corresponds to a physical address. In one example, the memory device has a starting virtual address of 0x8000000, which corresponds to a physical address of 0x0000000.

The memory copy device may provide efficient translation of a virtual memory address to its corresponding physical memory address.

The memory copy device also may copy data efficiently from a source memory segment to a destination memory segment while maintaining coherency among the main memory, the cache memory and the buffer memory.

This coherency may involve copying or writing data in the buffer memory, also referred to as source buffer memory in this case, to the main memory, and if needed, to the cache memory. The data is sometimes referred to as "dirty" lines.

Similarly, the coherency can also involve copying from the buffer memory, also referred to as destination buffer memory in this case, to the main memory, and if needed, to the cache memory. After this, memory eviction of the cache memory (destination) may be performed, and new data may be written to the destination buffer memory.

A method of operating the memory copy device according to an embodiment will now be described. The method includes a step of address translation and a step of cache memory coherency.

Referring to the address translation, during initialization or when a mapping between a source memory segment and a destination memory segment is changed, a software driver or other entity configures or generates address translation rules for the memory copy device.

The software driver then provides a memory copy (memcopy) request command to the memory copy device. The memory copy (memcopy) request command indicates as to whether a source address and/or a destination address are to be translated for optimizing use of virtual addresses, which are available in or used in a software for a particular operation.

The memory copy device later performs an appropriate translation of addresses based on the generated address translation rules. The memory copy device may perform translation of addresses for an unmapped address or can implement a simplified Memory Management Unit (MMU) logic for mapped addresses.

Referring to the cache memory coherency, the software driver may indicate with the memcopy request command to the memory copy device as to whether data is to be read from a source address and/or a destination address or data is to be written to/through a cache memory.

If an access to a buffer memory of a cache memory is required, the memory copy device then may translate the respective address for pointing to a cache memory region address that corresponds to a physical address space.

The memory copy device later may initiate a Direct Memory Access (DMA) read from the buffer memory or may initiate a DMA write to the buffer memory to maintain the cache memory coherent e.g. to the main memory and/or buffer memory.

The DMA read and/or the DMA write may be done in a manner that traverses a Cache Memory Sub-system and Coherency Manager.

This may be done by using driver sideband signals or by performing address transformations or translations to a cache memory address space. One way this may be achieved is to present transformed "accessthrough" cache memory addresses to an interconnect, which then routes the same through a CPU cache memory subsystem (that may include the cache memory) using an I/O cache memory coherency port while presenting to it the original address (before cache memory address transformation).

In short, in some aspects the instant application provides a hardware memory copy module for performing a memory copy conventionally provided as a software command. This may be done by performing an address translation between a physical address and a virtual address. Combined with a support of an homogenous data path from a source memory to a destination memory, software flags may be used to indicate whether data from the source memory is sent to a physical memory address or to a cache (virtual) memory address. This may allow the source memory and the destination memory to have different attributes.

In some aspects, the method of memory copy used by a system, with respect to physical and virtual addresses, may be detected by checking an Open Source driver used by the system.

The memory copy device provided by some aspects of the instant application may be different from a system that uses two copy processes. Such a system has more overhead and requires more system bandwidth to achieve or perform the same task.

The above is merely a brief overview over some features or elements of some embodiments and is not to be construed as limiting, as other embodiments may comprise different features or elements. Features or elements from different embodiments may be combined with each other.

BRIEF DESCRIPTION OF THE DRAWINGS

FIG. 1 illustrates a memory copy engine.

DETAILED DESCRIPTION

In the following detailed description, details are provided to describe embodiments of the application. It shall be apparent to one skilled in the art, however, that the embodiments may be practiced without such details. In other word, a description of an embodiment with a plurality of features or elements is merely to provide a better understanding to the skilled person, but is not to be construed as indicated that all these features or elements are necessary for implementation of an embodiment.

Some embodiments described may have similar parts. The similar parts may have same names or similar reference number. The description of one such part applies by reference to another similar part, where appropriate, thereby reducing repetition of text and providing a more concise description. This, however, does not imply that the similar parts are necessarily implemented in the same manner.

FIG. 1 shows a computing module 10 illustrating an embodiment. While module 10 will be described as comprising a plurality of modules or systems, two or more of these modules or systems may also be implemented together as a single module or system.

The computing module 10 includes a processor sub-system 13, a Double Data Rate (DDR) synchronous Dynamic Random-Access Memory (DRAM) module 16, and a hardware memory copy (HWMemCopy) engine 19.

The processor sub-system 13 comprises a first computing core 21 with a first cache memory 24, a second computing core 26 with a second cache memory 28, and an Input Output Control Port (IOCU) module 30. In other embodiments, only one such core or more than two cores may be provided. The cores may be implemented in a single processor (e.g. CPU or GPU), but may also be provided in different processors.

The HWMemCopy engine 19 includes an address translation module 32 and a cached access module 34 with a memory input/output (I/O) module 37, with a command register 40, and with a result register 43.

The memory I/O module 37 is connected to an Interconnect module 46, which is connected to ports 48 of the IOCU module 30 and to DDR ports 51 of the DDR DRAM module 16.

The command register 40 is connected to computing cores 21 and 26.

Result register 43 is connected to a Yield Manager module 52 that is in turn connected to the computing cores 21 and 26.

A method of using the HWMemCopy engine 19 is described below.

A software driver writes to registers of Address Translation module 32 of the HWMemCopy engine 19 for configuring translation of virtual memory address to physical memory address by the HWMemCopy engine 19. Instead of a software driver (running e.g. on one or both of cores, 21, 26) also another entity, e.g. a hardware module, may perform the corresponding functions in other embodiments.

The software driver also configures Cache Memory Access Transform parameters in the HWMemCopy engine 19 to enable the HWMemCopy engine 19 to perform cache memory I/O operation.

When a memory copy operation is initiated, the software driver provides the Command Register 40 of the HWMemCopy engine 19 with a source buffer memory address, a destination buffer memory address. The software driver also provides the Command Register 40 with a flag data regarding source address translation, a flag data regarding destination address translation, a flag data regarding cache source I/O buffer memory, and/or a flag data regarding cache destination I/O buffer memory.

The Address Translation Module 32 of the HWMemCopy engine 19 then performs translation of the source main memory address and the destination main memory address, when needed.

Address Translation Module 32 also may also performs translation of source cache memory address and destination cache memory address, when needed.

HWMemCopy engine 19 then reads data from a source buffer memory and writes corresponding data to a destination buffer memory using the Memory I/O module 37 that couples a DMA read channel to a DMA write channel.

A DMA-R engine 55 of the Memory I/O module 37 later may sends the physical source memory address and bytes per burst data to the Interconnect module 46 to read the source buffer memory.

The Interconnect module 46 decides to present the request to either the DDR port 51 or to the IOCU port 48 based on an address range of the address, e.g. based on whether the address belongs to an address range for the DDR memory, which may be an example for a main memory, or to another memory like a cache memory or the processor sub-system in general.

If the Interconnect module 46 directs the address to the IOCU port 48, the address has been adjusted to reflect its physical memory address.

The cache memory sub-system then reads data from the DDR port 51 if the received address is not in the cache memory 24 and/or 28.

The data, which is read by the DMA-R engine channel, is passed to the DMA-W engine channel, which transfers the source address and bytes per burst to the Interconnect module 46 for writing the data to a source buffer memory.

The Interconnect module 46 later decides to present the data either to the DDR port 51 or to the IOCU port 48 based on the memory address range of the destination memory address.

If the Interconnect module 46 transfers the memory address to IOCU port 48, the memory address has been adjusted to reflect its physical memory address of the destination memory.

The cache memory sub-system later writes the desired data via the DDR port 51 to maintain cache coherency. Some data in the cache memory 24 and 28 may not be coherent and need not be written to the DDR port 51 for improving performance. Also, cache data in a level one (L1) data cache can be replaced appropriately.

Once all burst segments of a DMA operation are complete, the HWMemCopy engine 19 issues an interrupt signal to the respective requesting CPU core 21 or 26 regarding completion of the requested memory copy (memcpy) operation.

This manner of memory copy has an advantage of not hogging CPU time. The HWMemCopy engine 19 especially improves networking throughput and maximizes application performance for embedded CPU.

This is different from many kinds of software systems using a memory copy, also called a memcpy function, which significantly hogs CPU time as the CPU has to run the respective software. Examples of systems using such a software approach are software system are routers, gateways, and Network Attached Storage (NAS) devices. In embodiments, the above-described techniques may be used in such systems instead of the conventional software approach.

Although the above description contains much specificity, this should not be construed as limiting the scope of the embodiments but merely providing a more detailed illustration.

The above stated advantages of some of the embodiments should not be construed as limiting the scope of the embodiments but merely to explain possible achievements if the described embodiments are put into practice. Other embodiments may not have such advantages as described. Thus, the scope of the application should be determined by the claims and their equivalents, rather than by the examples given.

The invention claimed is:

1. An apparatus comprising:
a main memory;
at least one cache memory;
a memory copy device connectable with the main memory and the cache memory, wherein the memory copy device to access data in the main memory and data in the cache memory, to manage reading and writing data between the main memory and the cache memory, and to maintain data coherence between the main memory and the cache memory; and
an interconnect module coupled to the main memory and the at least one cache memory, wherein the interconnect module is configured to present a request for a Direct Memory Access (DMA) operation to either the main memory or the cache memory based on an address range of a destination memory address.

2. The apparatus of claim 1, wherein the memory copy device comprises a DMA engine to manage the reading and writing data between the cache memory and the main memory.

3. The apparatus of claim 1, further comprising a central processing unit (CPU).

4. The apparatus of claim 1, further comprising a graphics processing unit (GPU).

5. The apparatus of claim 1, wherein the memory copy device further comprises an address translation device to translate between a memory physical address and a memory virtual address.

6. The apparatus of claim 1, wherein the memory copy device to perform a memory eviction to maintain the data coherence.

7. At least one non-transitory computer readable storage medium comprising instructions which, when executed, cause one or more processors to at least:
access data in the main memory and data in the cache memory;
manage reading and writing data between the main memory and the cache memory;
maintain data coherence between the main memory and the cache memory; and
present a request for a Direct Memory Access (DMA) operation to either the main memory or the cache memory based on an address range of a destination memory address.

8. The at least one non-transitory computer readable storage medium of claim 7, comprising a DMA engine to manage the reading and writing data between the cache memory and the main memory.

9. The at least one non-transitory computer readable storage medium of claim 7, comprising a central processing unit (CPU).

10. The at least one non-transitory computer readable storage medium of claim 7, comprising a graphics processing unit (GPU).

11. The at least one non-transitory computer readable storage medium of claim 7, further to translate between a memory physical address and a memory virtual address.

12. The at least one non-transitory computer readable storage medium of claim 7, further to perform a memory eviction to maintain the data coherence.

13. A system comprising:
a main memory;
at least one cache memory;
a central processing unit (CPU);
a memory copy device connectable with the main memory and the cache memory, wherein the memory copy device to access data in the main memory and data in the cache memory, to manage reading and writing data between the main memory and the cache memory, and to maintain data coherence between the main memory and the cache memory; and
an interconnect module coupled to the main memory and the at least one cache memory, wherein the interconnect module is configured to present a request for a Direct Memory Access (DMA) operation to either the main memory or the cache memory based on an address range of a destination memory address.

14. The system of claim 13, wherein the memory copy device comprises a DMA engine to manage the reading and writing data between the cache memory and the main memory.

15. The system of claim 13, further comprising a graphics processing unit (GPU).

16. The system of claim 13, wherein the memory copy device further comprises an address translation device to translate between a memory physical address and a memory virtual address.

17. The system of claim 13, wherein the memory copy device to perform a memory eviction to maintain the data coherence.

* * * * *